United States Patent
Lin

(10) Patent No.: US 7,683,829 B2
(45) Date of Patent: Mar. 23, 2010

(54) METHOD AND APPARATUS FOR ADAPTING A RECEIVER FREQUENCY PLAN ACCORDING TO LOCATION

(75) Inventor: Qiang Lin, Fountain Valley, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 324 days.

(21) Appl. No.: 11/409,799

(22) Filed: Apr. 24, 2006

(65) Prior Publication Data

US 2007/0247357 A1      Oct. 25, 2007

(51) Int. Cl.
G01S 1/00 (2006.01)
H04B 7/00 (2006.01)
H04B 1/06 (2006.01)

(52) U.S. Cl. .................................. 342/357.06; 455/256

(58) Field of Classification Search ............ 342/357.06; 455/255
See application file for complete search history.

(56) References Cited

U.S. PATENT DOCUMENTS

| | | | | |
|---|---|---|---|---|
| 4,761,825 A * | 8/1988 | Ma | ........................... | 455/183.2 |
| 4,888,815 A * | 12/1989 | Ahlemeyer et al. | ...... | 455/168.1 |
| 6,249,559 B1 * | 6/2001 | Jun | ............................ | 375/376 |
| 6,526,322 B1 * | 2/2003 | Peng et al. | ..................... | 700/5 |
| 6,968,159 B2 * | 11/2005 | Morishige | .................... | 455/76 |
| 7,076,226 B2 * | 7/2006 | Bult et al. | ................. | 455/252.1 |
| 7,082,292 B2 * | 7/2006 | Underbrink | .................. | 455/255 |
| 2002/0054627 A1 * | 5/2002 | Asikainen | .................... | 375/219 |
| 2003/0058053 A1 * | 3/2003 | Jeon et al. | ..................... | 331/17 |
| 2004/0086057 A1 * | 5/2004 | Lee et al. | ...................... | 375/295 |
| 2004/0137937 A1 * | 7/2004 | Oesch | ...................... | 455/550.1 |
| 2004/0166825 A1 * | 8/2004 | Huang et al. | ................. | 455/313 |
| 2005/0219001 A1 * | 10/2005 | Booth | .......................... | 331/17 |
| 2005/0226353 A1 * | 10/2005 | Gebara et al. | ............... | 375/346 |
| 2006/0229046 A1 * | 10/2006 | Bult et al. | ................. | 455/252.1 |

* cited by examiner

Primary Examiner—Thomas H Tarcza
Assistant Examiner—Harry Liu
(74) Attorney, Agent, or Firm—Bay Area Technology Law Group PC

(57) ABSTRACT

A selectable frequency source for use in GPS receivers. A device in accordance with the present invention comprises a reference frequency source, a first divider, coupled to the reference frequency source, the first divider having a first dividing factor, a first mixer, coupled to the first divider, a filter, coupled to the first mixer, a voltage controlled oscillator, coupled to the filter, a second divider, coupled between the voltage controlled oscillator and the first mixer, the second divider having a second dividing factor, and a second mixer, coupled to an output of the voltage controlled oscillator, for mixing a GPS signal with the output of the voltage controlled oscillator, wherein at least one of the first dividing factor and the second dividing factor is changed to change a frequency output of the voltage controlled oscillator.

20 Claims, 7 Drawing Sheets

METHOD AND APPARATUS FOR ADAPTING A RECEIVER FREQUENCY PLAN ACCORDING TO LOCATION

BACKGROUND OF THE INVENTION

1. Field of the Invention

The present invention relates generally to Global Positioning System (GPS) receivers, and in particular, to a method and apparatus for adapting a frequency plan based on location of the GPS receiver.

2. Description of the Related Art

The use of GPS in consumer products has become commonplace. Hand-held devices used for mountaineering, automobile navigation systems, and GPS for use with cellular telephones are just a few examples of consumer products using GPS technology.

GPS-enabled devices, such as cellular telephones, have also been introduced into the consumer marketplace. These devices allow for the use of Location-Based Services (LBS) which are services, advertisements, and other features that are offered based on the location of the user. As such, GPS-enabled devices are used worldwide.

The use of the frequency spectrum in the United States is very tightly controlled by the government. In other countries, the frequency allotments for telephone use, radio navigation, etc. are allocated differently, and thus, devices that operate in their own frequency band may have to share that frequency band with other devices in other countries. As such, when a GPS-enabled device is brought from one country to another, the operability of such a device may be less than desirable.

It can be seen, then, that there is a need in the art to make GPS-enabled devices operable in countries with various frequency spectrum allocations.

SUMMARY OF THE INVENTION

To minimize the limitations in the prior art, and to minimize other limitations that will become apparent upon reading and understanding the present specification, the present invention describes a selectable frequency source for use in GPS receivers. A device in accordance with the present invention comprises a reference frequency source, a first divider, coupled to the reference frequency source, the first divider having a first dividing factor, a first mixer, coupled to the first divider, a filter, coupled to the first mixer, a voltage controlled oscillator, coupled to the filter, a second divider, coupled between the voltage controlled oscillator and the first mixer, the second divider having a second dividing factor, and a second mixer, coupled to an output of the voltage controlled oscillator, for mixing a GPS signal with the output of the voltage controlled oscillator, wherein at least one of the first dividing factor and the second dividing factor is changed to change a frequency output of the voltage controlled oscillator.

Such a device further optionally includes the frequency output of the voltage controlled oscillator being changed by changing the second dividing factor, the frequency output of the voltage controlled oscillator being changed when the GPS receiver determines that the GPS receiver is in a predetermined geographic region, the predetermined geographic region being determined by a presence of an interfering signal, the interfering signal being a PDC signal, the predetermined geographic region being determined by the GPS receiver determining a geoposition, and the predetermined geographic region being determined by determining the location of an Internet Protocol (IP) address.

An alternative embodiment of the present invention comprises a reference frequency source generating a reference frequency, a circuit, coupled to the reference frequency source, the circuit having an output frequency which is scaled in relation to the reference frequency, and a mixer, coupled to the circuit, for mixing a GPS signal with the output frequency of the circuit, wherein the output frequency of the circuit is changed to change a frequency output of the mixer.

Such an embodiment further optionally includes the output frequency being changed by changing a multiplication factor of the circuit, the output frequency being changed by changing a division factor of the circuit, the output frequency being changed when the GPS receiver determines that the GPS receiver is in a predetermined geographic region, the predetermined geographic region being determined by a presence of an interfering signal, the interfering signal being a PDC signal, the predetermined geographic region being determined by the GPS receiver determining a geoposition, the predetermined geographic region being determined by determining the location of an Internet Protocol (IP) address, the circuit comprising a first divider, and a second divider, and a ratio between the first divider and the second divider determines the output frequency of the circuit, and the circuit further comprises a third divider, and a scaling factor of the third divider determines the output frequency of the circuit.

A method in accordance with the present invention comprises determining that the GPS receiver is in a predetermined geographic region, and changing the local oscillator frequency when the GPS receiver is in the predetermined geographic region.

Such a method further optionally comprises the predetermined geographic region being determined by a presence of an interfering signal, and the predetermined geographic region being determined by the GPS receiver determining a geoposition.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Figure 1:
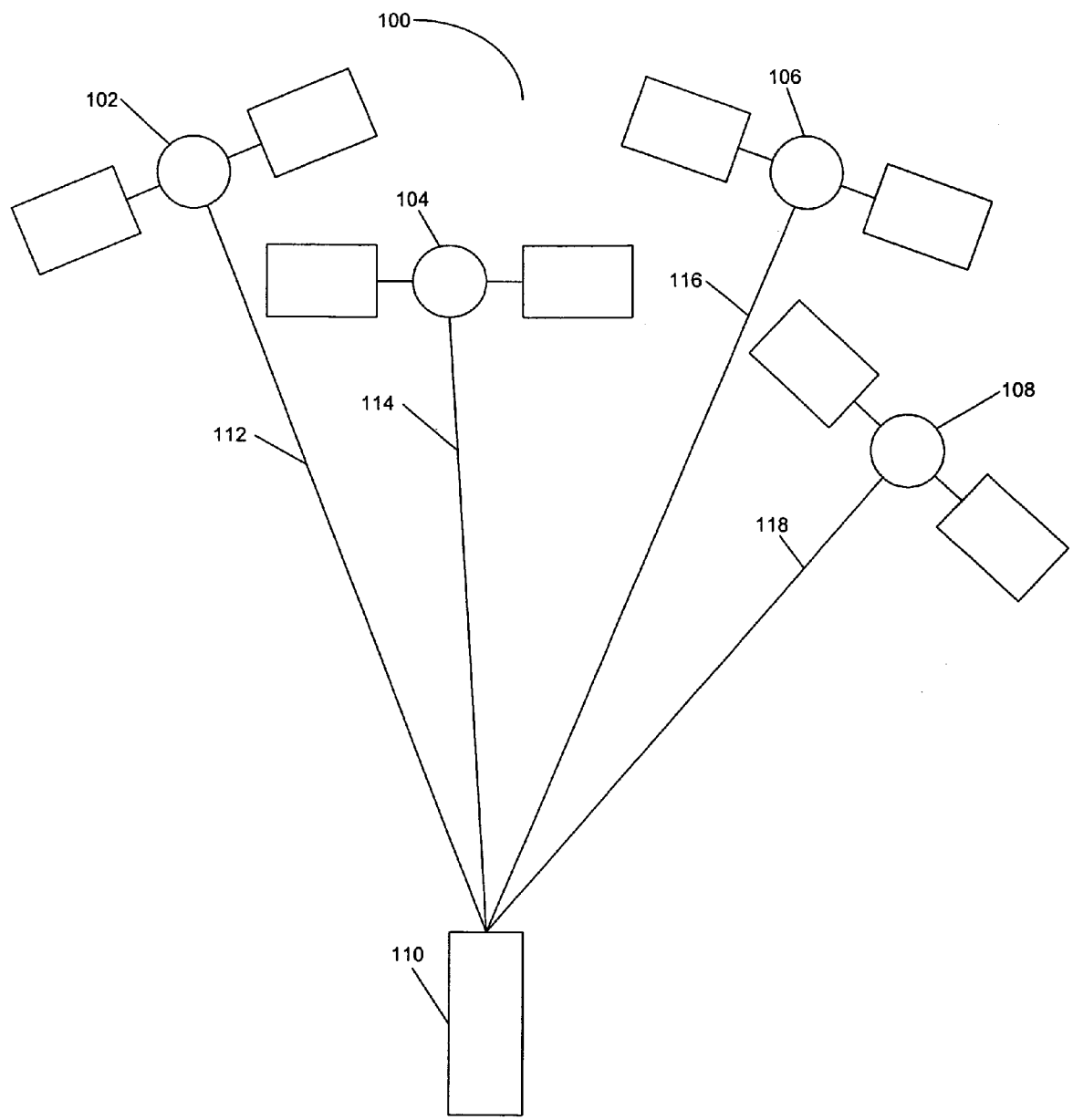
FIG. 1 illustrates a typical Satellite Positioning System in accordance with the present invention.

FIG. 1 illustrates a typical Satellite Positioning System in accordance with the present invention.

System 100 illustrates a constellation of satellites 102-108 and a receiver 110. Each of the satellites 102-108 transmits a signal 112-118 respectively, which signals 112-118 are received by receiver 110.

Signals 112-118 contain information such as time of transmission and system time for system 100. Receiver 110 uses the time it takes for signals 112-118 to travel the distances between the satellites 102-108 and receiver 110 and the data within signals 112-118 to determine the x, y, and z coordinates (geoposition) of receiver 110. This generic ranging system is typically known as the Global Positioning System (GPS), which is described in the related art.

The frequencies of interest in a GPS system 100 are in the "L-band" of frequencies, typically around 1575 MHz, but other positioning systems with other frequencies of interest can also benefit from the present invention.

Frequency Allocation

The frequency usage allocation in different countries and areas are different, and, therefore, in a transceiver (including receiver and transmitter here) designs, e.g., for receiver 110, a fixed frequency plan (LO, IF and Baseband frequencies) may not yield equally good performance in all of the diverse geographic markets and areas.

However, for receivers 110, the geographic information can be obtained by the receiver 110, and thus, it is possible to switch frequency plans to the one that suits the situation best in the country/area that the receiver 110 is being used.

For GPS receiver or cell phone related products, the detection of geographic location is trivial since such information can be easily obtained from GPS signals and cell phone carrier information. To extend the application of this invention, it is possible that the user input the location information for those systems that location information cannot be obtained automatically.

Figure 2:
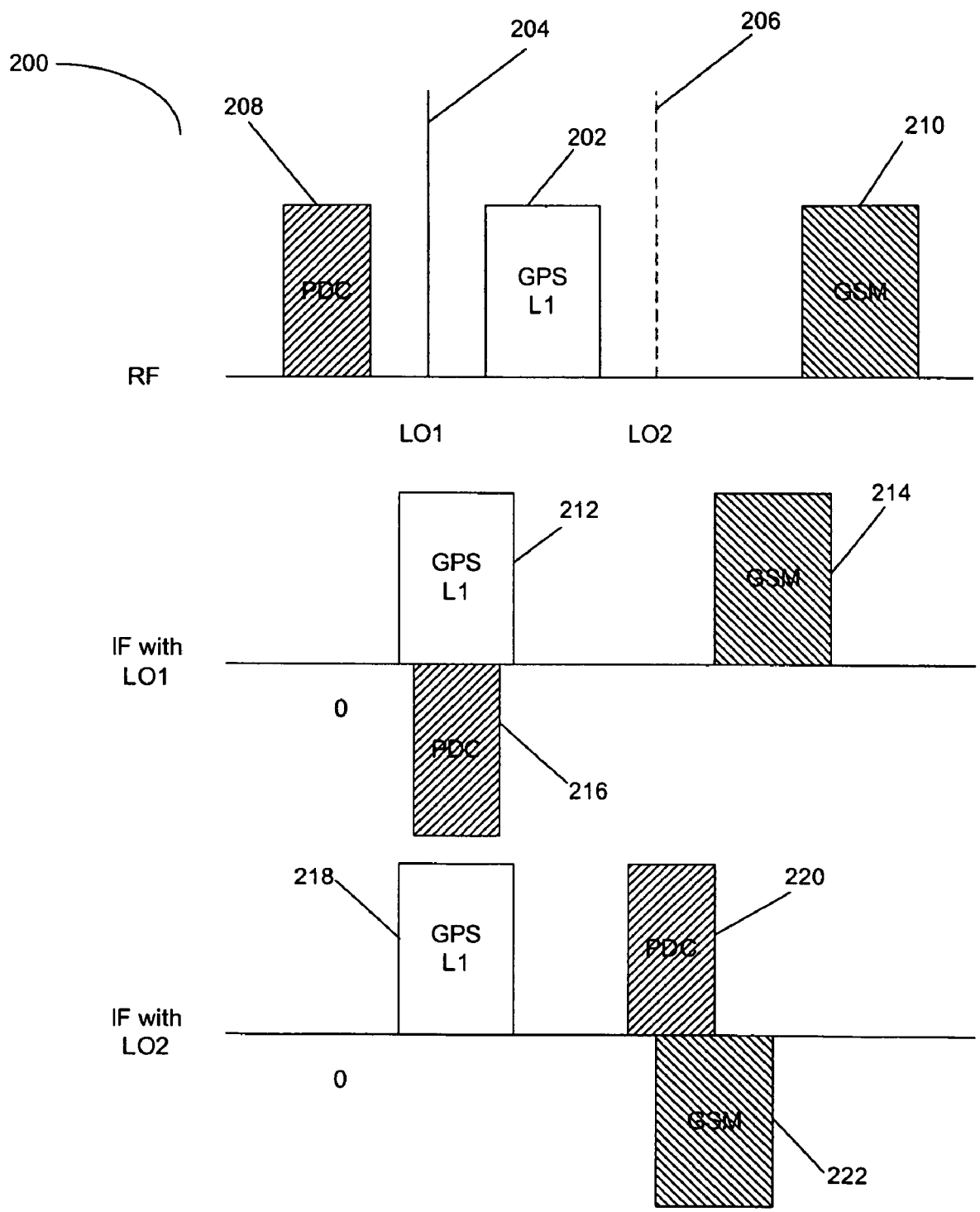
FIG. 2 illustrates the RF and IF frequency plans for a GPS receiver in accordance with the present invention.

FIG. 2 illustrates the RF and IF frequency plans for a GPS receiver in accordance with the present invention.

Frequency usage 200 is illustrated, with GPS frequencies 202, Local Oscillator (LO) frequency for LO1 204, LO frequency for LO2 206, PDC frequencies 208, and GSM frequencies 210 shown. At the transmission frequency band, the GPS frequencies 202 fall between the GSM frequencies 210 and the PDC frequencies 208.

However, when the RF frequencies 202, 208, and 210 are downconverted using LO1 204, GPS Intermediate Frequencies (IF) 212 fall within the same frequency band as PDC IF frequencies 216. This makes it more difficult for receiver 110 to find GPS signals 202, because there is local interference from the PDC signals 216.

In the GPS receiver 110 as an example, GPS L1 frequencies 202 occupy the band centered at 1575.42 MHz. Major interferers with this frequency band 202 are cellular telephone users. For a super-heterodyne GPS receiver, the LO frequency 204 should be selected lower than frequency band 202 to maximize the distance (frequency-wise) between the 1710 MHz GSM signals 210 and GPS signals 202.

However, in Japan, there is a frequency band 208 used for the Japanese cellular system, known as the PDC band 208, that occupies frequencies up to 1501 MHz. The PDC band 216 can be very close or right inside of the image band of GPS signals 212 when the LO frequency 204 is lower than GPS band 206 and the IF 212 is low.

A conventional design typically changes the IF band 212 for all cases to a much higher frequency, which will increase power consumption and make the IF filter more difficult to design, or change the IF band 212 to a lower or close to DC frequency, which requires image-reject down-conversion and cause problems in DC offset cancellation. Either way will increase power consumption, complexity and degrade performance.

However, the present invention adapts the IF band 212 and 218 depending on whether or not the receiver 110 is in Japan, or, in other cases, when there are other interfering signals present nearby the IF signals 212 and/or 218.

As such, when PDC signals 208 are present, the receiver 110 of the present invention has the ability to use a different Local Oscillator frequency, namely, LO2 208, to downconvert the GPS signals 202 into a different frequency band, namely, frequency band 218, and, similarly, PDC signals will be downconverted into frequency band 220 and GSM frequencies will be downconverted into frequency band 222.

This adaptable nature of the present invention is operable in GPS-enabled devices because PDC signals 208 and GSM signals 210 do not co-exist in any geographic areas, but the receiver 110 can travel to markets where either PDC signals 208 or GSM signals 210 exist. Receiver 110 can have a predetermined local oscillator frequency to use, and, if certain situations or conditions exist, the local oscillator can switch from one to another. For example, and not by way of limitation, the receiver 110 can be set to use LO1 204 as a standard operating mode, and, if PDC signals 208 are present, or receiver 110 determines that receiver 110 is in an area where PDC signals 208 would be present, then receiver 110 uses local oscillator frequency LO2 206 instead of LO1 frequency 204.

PDC signals 208 are typically present only in Japan, and, therefore, receiver 110 can use several pieces of data to determine whether or not to switch from one local oscillator frequency to another. Receiver 110 can determine a position, and, if that position determination shows that receiver 110 is in Japan, a command can be sent to switch to LO2 frequency 206. A sensor can be used to determine if PDC signals 208 are present, and the switch to LO2 frequency 206 can be made at that time. Further, the receiver 110 may be part of a GPS-enabled device that can sense Internet Protocol (IP) addresses. Since the location of IP addresses can be determined by a reverse DNS lookup and the "Whois" database, or via commercially available software, receiver 110 can use that data to determine whether or not receiver 110 is in Japan and therefore needs to switch to LO2 frequency 206.

Similarly, GSM signals 210 are not present in Japan. So, a sensor can be used to determine the presence or absence of GSM signals 210, and the local oscillator frequency can be selected based on the presence or absence of GSM signals 210.

A GPS receiver 110 in accordance with the present invention can also determine when to switch the local oscillator frequency based on the GPS signal quality. If the GPS signal quality is poor, it is likely because there is a PDC and/or GSM and/or other signal interfering with the GPS signal, either at the RF band or the IF band. The local oscillator frequency can then be switched to determine if the signal to noise ratio can be improved, either by avoiding the PDC/GSM/Other signal interference, or, perhaps, by allowing the GPS receiver to downconvert a signal from a different GPS band, say the L2 or L5 band.

Figure 3:
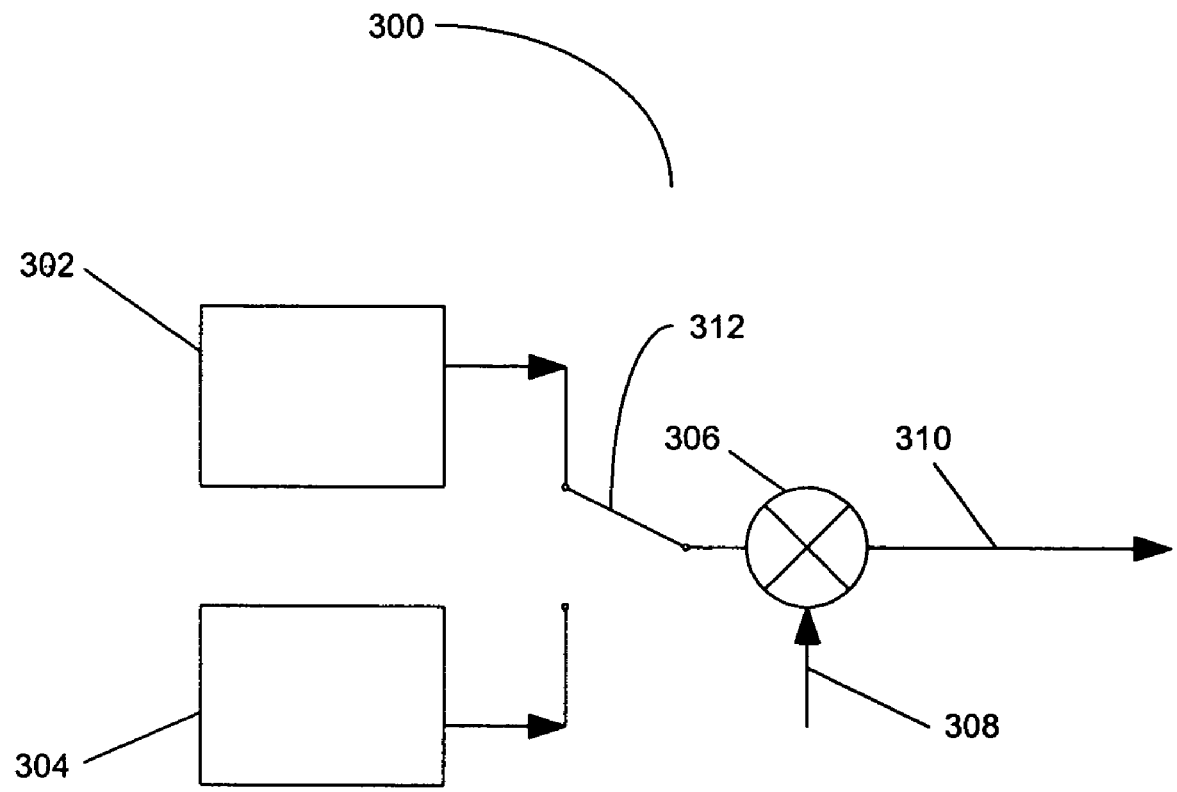
FIG. 3 illustrates a block diagram of a frequency generator in accordance with the present invention.

FIG. 3 illustrates a block diagram of a frequency generator in accordance with the present invention.

System 300 shows a first local oscillator 302, a second local oscillator 304, a mixer 306, an incoming signal 308, and output 310. Switch 312 is switched when the system 300 determines that an interfering signal, such as PDC signal 208, is present, or when receiver 110 determines that the position of receiver 110 would have interfering signals present, and therefore, receiver 110 needs to use second local oscillator 304 rather than first local oscillator 302.

Figure 4:
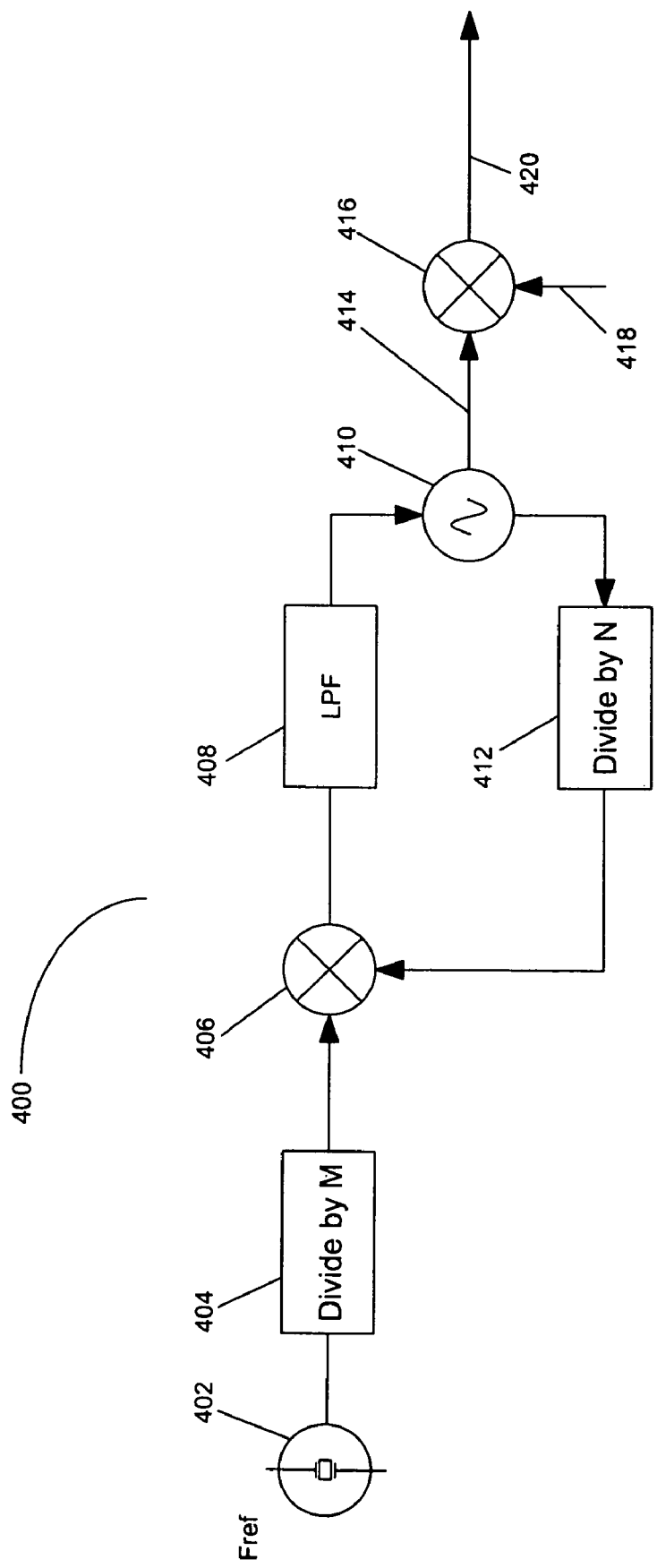
FIG. 4 illustrates a typical implementation of the block diagram of FIG. 3.

FIG. 4 illustrates a typical implementation of the block diagram of FIG. 3.

Although two separate local oscillators 302 and 304 can be used, such an implementation is typically not very cost effective, and generates interference because of the interaction between first local oscillator 302 and second local oscillator 304 within the same receiver 110. As such, system 400 is a more typical approach to implementation of the present invention.

System 400 comprises a reference frequency 402, which is typically generated by a crystal, that is input to a divider circuit 404. The frequency that is output from reference frequency 402 is Fref. Divider circuit 404 is a "divide by M" circuit, such that the frequency that is output from divider circuit 404 is Fref/M. The output of divider circuit 404 is input to mixer 406.

The output of mixer 406 is input to a low pass filter 408, which generates a control voltage that controls the output of a Voltage Controlled Oscillator (VCO) 410. The output of VCO 410 is input to another divider circuit 412, that is then fed into mixer 406. Divider circuit 412 is a "divide by N" circuit, which divides the output of the VCO 410 by N.

When the circuit 400 is in operation, output 414 is the output of the VCO 410, and is equal to N/M Fref. This output 414 is mixed at mixer 416 with the GPS RF signal 418 to generate the GPS IF signal 420.

Divide circuits 404 and 412 are typically implemented as counter circuits. By changing the counter values, the M and N divide values can be changed. For example, to change the output of the VCO 410, the counter value for divide circuit can be changed from N1 to N2, which would change the frequency of the VCO output 414 from N1/M Fref to N2/M Fref. Additional values of N can be used to have several different frequency outputs at VCO output 414 if desired. Further, control of the VCO output 414 can be changed by changing the M values for divider circuit 404 if desired, or the values can be changed by changing both M and N values if desired.

So, if the two LO frequencies 204 and 206 are known, it is straightforward to determine the N and M values needed for a given Fref 402 to generate different IF outputs 420 for circuit 400.

Again, default values of N and/or M for divider circuits 404 and 412 can be set, and these values changed when a certain condition occurs or a certain state of the receiver 110 is entered. For example, and not by way of limitation, receiver 110 can determine a position, or receiver 110 can determine that a specific signal is present, such as the PDC signal. Once receiver 110 has data to indicate that receiver 110 is in Japan, receiver 110 changes the counter values for N and/or M to generate a new VCO output 414, and the IF output 420 will change to avoid interference with the PDC signal.

Manual override of any switching of the VCO output 414, or manual determination of the VCO output 414, is also possible within the scope of the present invention. For example, and not by way of limitation, if the PDC signal 208 is so strong that the receiver 110 cannot determine position, a user can manually override the VCO output 414 determination to force the system 400 to switch to the different N and/or M values to avoid the PDC signal 208 interference.

Figure 5:
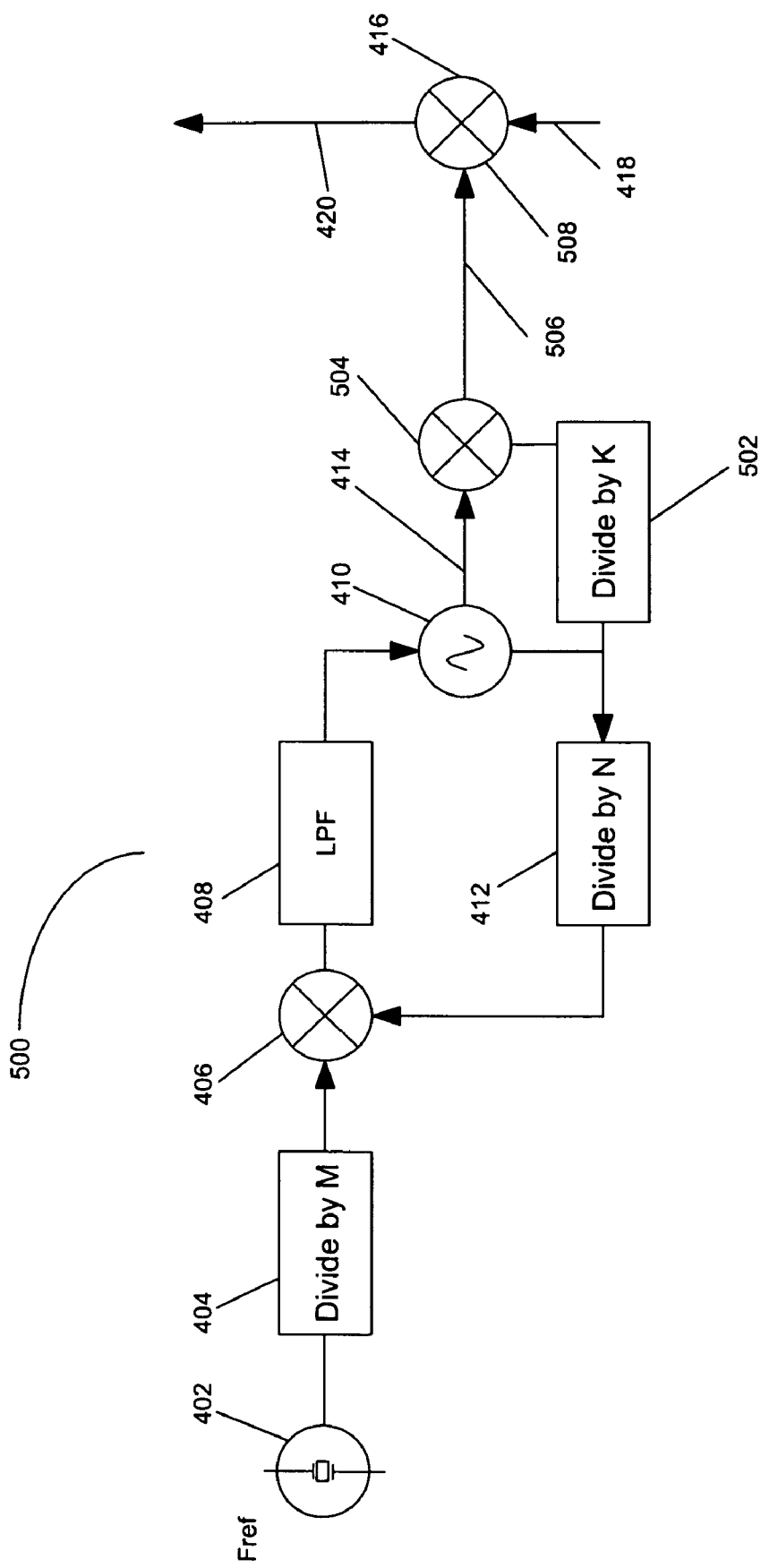
FIG. 5 illustrates an alternative embodiment of the present invention.

FIG. 5 illustrates an alternative embodiment of the present invention.

Circuit 500 is similar to circuit 400, but an additional divide circuit 502, a "Divide by K" circuit is connected to an additional mixer 504. By changing the values of K in the divide circuit 502, the output frequency 506 of the circuit 500 changes. This may be a preferred implementation to switch between different GPS frequencies 418, e.g., the "L1" band and the "L2" band and/or the "L5" band, as well as to select the proper IF output 420 for GSM/PDC interferences via the mixer 508.

Figure 6:
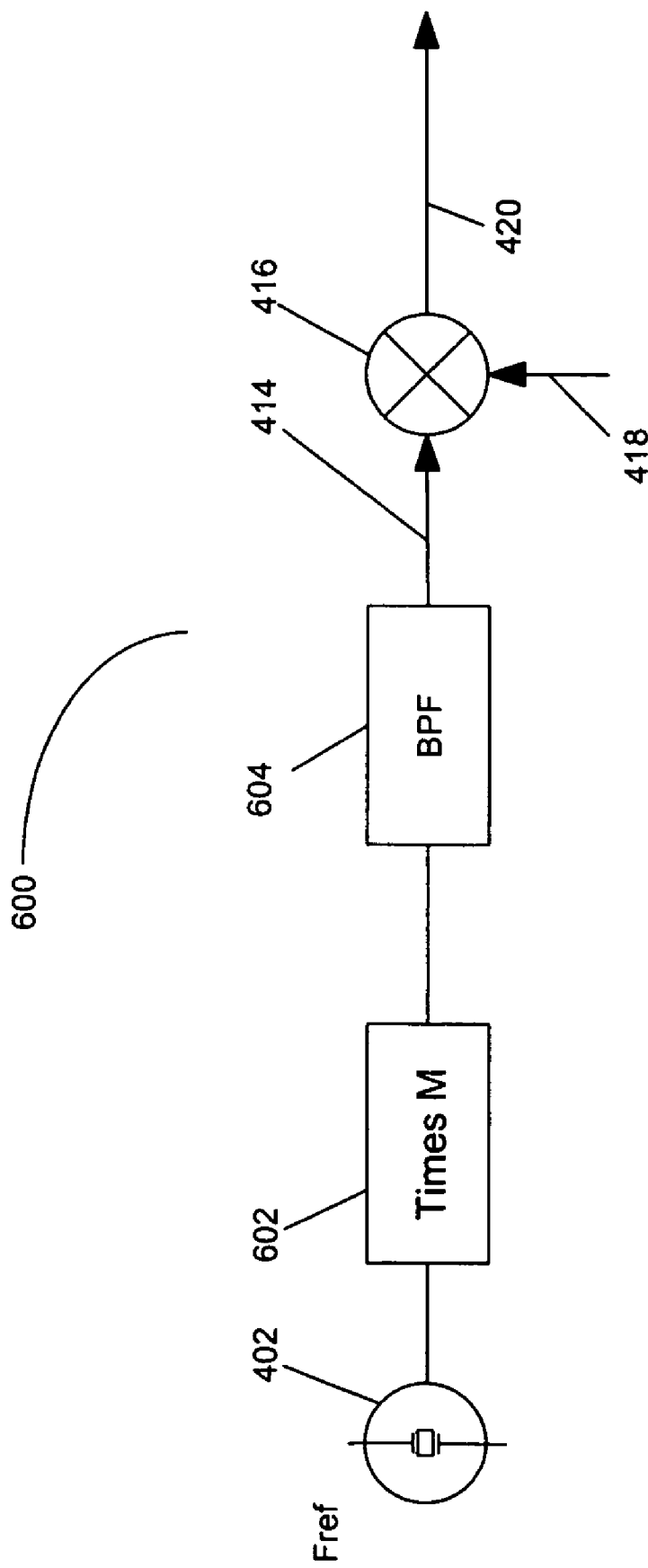
FIG. 6 illustrates another alternative embodiment of the present invention.

FIG. 6 illustrates another alternative embodiment of the present invention.

Circuit 600 shows a "times M" circuit 602 that is output to a bandpass filter 604. By programming the bandpass filter 604, different frequencies can be generated at output 414, and mixed at mixer 416 with GPS signal 418 to generate different IF outputs 420. Several different methods can be used to generate the times M outputs, e.g., an Impact ionization Avalanche Transit-Time (IMPATT) diode, a frequency multiplier, a varactor, or other circuit devices, without departing from the scope of the present invention.

Process Chart

Figure 7:
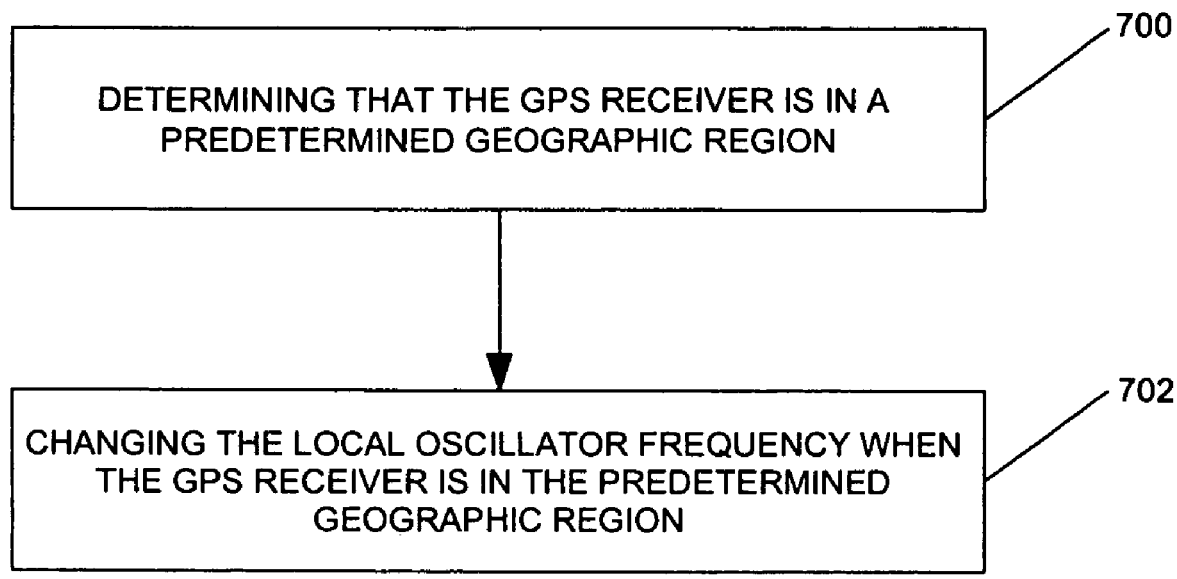
FIG. 7 illustrates a flowchart illustrating the steps used to perform the present invention.

FIG. 7 illustrates a flowchart illustrating the steps used to perform the present invention.

Block 700 illustrates determining that the GPS receiver is in a predetermined geographic region.

Block 702 illustrates changing the local oscillator frequency when the GPS receiver is in the predetermined geographic region.

Conclusion

In summary, the present invention describes a selectable frequency source for use in GPS receivers. A device in accordance with the present invention comprises a reference frequency source, a first divider, coupled to the reference frequency source, the first divider having a first dividing factor, a first mixer, coupled to the first divider, a filter, coupled to the first mixer, a voltage controlled oscillator, coupled to the filter, a second divider, coupled between the voltage controlled oscillator and the first mixer, the second divider having a second dividing factor, and a second mixer, coupled to an output of the voltage controlled oscillator, for mixing a GPS signal with the output of the voltage controlled oscillator, wherein at least one of the first dividing factor and the second dividing factor is changed to change a frequency output of the voltage controlled oscillator.

Such a device further optionally includes the frequency output of the voltage controlled oscillator being changed by changing the second dividing factor, the frequency output of the voltage controlled oscillator being changed when the GPS receiver determines that the GPS receiver is in a predetermined geographic region, the predetermined geographic region being determined by a presence of an interfering signal, the interfering signal being a PDC signal, the predetermined geographic region being determined by the GPS receiver determining a geoposition, and the predetermined geographic region being determined by determining the location of an Internet Protocol (IP) address.

An alternative embodiment of the present invention comprises a reference frequency source generating a reference frequency, a circuit, coupled to the reference frequency source, the circuit having an output frequency which is scaled in relation to the reference frequency, and a mixer, coupled to the circuit, for mixing a GPS signal with the output frequency of the circuit, wherein the output frequency of the circuit is changed to change a frequency output of the mixer.

Such an embodiment further optionally includes the output frequency being changed by changing a multiplication factor of the circuit, the output frequency being changed by changing a division factor of the circuit, the output frequency being changed when the GPS receiver determines that the GPS receiver is in a predetermined geographic region, the predetermined geographic region being determined by a presence of an interfering signal, the interfering signal being a PDC signal, the predetermined geographic region being determined by the GPS receiver determining a geoposition, the predetermined geographic region being determined by determining the location of an Internet Protocol (IP) address, the circuit comprising a first divider, and a second divider, and a ratio between the first divider and the second divider determines the output frequency of the circuit, and the circuit further comprises a third divider, and a scaling factor of the third divider determines the output frequency of the circuit.

A method in accordance with the present invention comprises determining that the GPS receiver is in a predetermined geographic region, and changing the local oscillator frequency when the GPS receiver is in the predetermined geographic region.

Such a method further optionally comprises the predetermined geographic region being determined by a presence of an interfering signal, and the predetermined geographic region being determined by the GPS receiver determining a geoposition.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims and the equivalents of the claims which form a part of this application.

What is claimed is:

1. A selectable frequency source for use in a Global Positioning System (GPS) receiver, comprising:
    a reference frequency source;
    a first divider, coupled to the reference frequency source, the first divider having a first dividing factor;
    a first mixer, coupled to the first divider;
    a filter, coupled to the first mixer;
    a voltage controlled oscillator, coupled to the filter;
    a second divider, coupled between the voltage controlled oscillator and the first mixer, the second divider having a second dividing factor; and
    a second mixer, coupled to an output of the voltage controlled oscillator, for controlling the frequency of the voltage controlled oscillator, wherein at least one of the first dividing factor and the second dividing factor is automatically changed to change a frequency output of the voltage controlled oscillator, in response to an external interfering signal.

2. The selectable frequency source of claim 1, wherein the frequency output of the voltage controlled oscillator is changed by changing the second dividing factor.

3. The selectable frequency source of claim 2, wherein the frequency output of the voltage controlled oscillator is changed when the GPS receiver determines that the GPS receiver is in a predetermined geographic region.

4. The selectable frequency source of claim 3, wherein the predetermined geographic region is determined by the presence of the interfering signal.

5. The selectable frequency source of claim 4, wherein the interfering signal is a PDC signal.

6. The selectable frequency source of claim 3, wherein the predetermined geographic region is determined by the GPS receiver determining a geoposition.

7. The selectable frequency source of claim 3, wherein the predetermined geographic region is determined by determining the location of an Internet Protocol (IP) address.

8. A selectable frequency source for use in a Global Positioning System (GPS) receiver, comprising:
    a reference frequency source generating a reference frequency;
    a circuit, coupled to the reference frequency source, the circuit having an output frequency which is scaled in relation to the reference frequency;
    a mixer, coupled to the circuit, wherein the output frequency of the circuit is automatically changed to change a frequency output of the mixer in response to a presence of an external interfering signal.

9. The selectable frequency source of claim 8, wherein the output frequency is changed by changing a multiplication factor of the circuit.

10. The selectable frequency source of claim 8, wherein the output frequency is changed by changing a division factor of the circuit.

11. The selectable frequency source of claim 8, wherein the output frequency is changed when the GPS receiver determines that the GPS receiver is in a predetermined geographic region.

12. The selectable frequency source of claim 11, wherein the predetermined geographic legion is determined by the presence of the interfering signal.

13. The selectable frequency source of claim 12, wherein the interfering signal is a PDC signal.

14. The selectable frequency source of claim 11, wherein the predetermined geographic region is determined by the GPS receiver determining a geoposition.

15. The selectable frequency source of claim 11, wherein the predetermined geographic region is determined by determining the location of an Internet Protocol (IP) address.

16. The selectable frequency source of claim 8, wherein the circuit comprises a first divider, and a second divider; and a ratio between the first divider and the second divider determines the output frequency of the circuit.

17. The selectable frequency source of claim 16, wherein the circuit further comprises a third divider, and a scaling factor of the third divider determines the output frequency of the circuit.

18. A method fox changing a local oscillator frequency in a Global Positioning System (GPS) receiver, comprising:
    determining that the GPS receiver is in a predetermined geographic region; and
    automatically changing the local oscillator frequency when the GPS receiver is in the predetermined geographic region in response to a presence of an external interfering signal.

19. The method of claim 18, wherein the predetermined geographic legion is determined by a presence of the interfering signal.

20. The method of claim 18, wherein the predetermined geographic region is determined by the GPS receiver determining a geoposition.

* * * * *